(12) United States Patent
Itoh et al.

(10) Patent No.: US 7,529,793 B2
(45) Date of Patent: *May 5, 2009

(54) WEB SERVICE SIMPLE OBJECT ACCESS PROTOCOL REQUEST RESPONSE PROCESSING

(75) Inventors: Takayuki Itoh, Yokohama (JP); Masayoshi Teraguchi, Yokohama (JP); Yumi Yamaguchi, Yamato (JP); Akiko Nishikai, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 837 days.

This patent is subject to a terminal disclaimer.

(21) Appl. No.: 11/101,314

(22) Filed: Apr. 7, 2005

(65) Prior Publication Data
US 2006/0036754 A1   Feb. 16, 2006

(30) Foreign Application Priority Data
Apr. 8, 2004   (JP) .............................. 2004-114730

(51) Int. Cl.
*G06F 15/16* (2006.01)
(52) U.S. Cl. .................. 709/203; 719/330; 713/171; 713/176; 709/201; 709/202
(58) Field of Classification Search ......... 709/201–203; 719/330; 713/171, 176
See application file for complete search history.

(56) References Cited

U.S. PATENT DOCUMENTS

| | | | | |
|---|---|---|---|---|
| 7,349,959 B2 * | 3/2008 | Imamura et al. | ............ | 709/223 |
| 2002/0099844 A1 * | 7/2002 | Baumann et al. | ............ | 709/232 |
| 2004/0194105 A1 * | 9/2004 | Shenfield et al. | ............ | 718/100 |
| 2005/0021799 A1 * | 1/2005 | Imamura et al. | ............ | 709/230 |

FOREIGN PATENT DOCUMENTS

JP   2002091911   3/2002

OTHER PUBLICATIONS

Web Services Light Ref.
XML Encryptions Ref.
IBM "Web Services Security (WS-Security)", Apr. 1, 2004, URL: http://www-106.ibm.com/developerworks/webservices/library/ws-secure/.

(Continued)

*Primary Examiner*—Nathan J. Flynn
*Assistant Examiner*—James E Conaway
(74) *Attorney, Agent, or Firm*—Louis P. Herzberg; Shimokaji & Associates, P.C.

(57) ABSTRACT

Reduces time for processing a request Simple Object Access Protocol, SOAP, message in a request means such as mobile equipment or the like. Sequence definition means divides one parent SOAP message as one request concerning a Web Service into segments of a Simple Object Access Protocol header and a SOAP body. Segment creation means creates the segment of the Simple Object Access Protocol body of the parent SOAP message and the segment of the SOAP header of the parent Simple Object Access Protocol message in this order. Sending means executes sending processing in parallel with creation processing by the segment creation means. Specifically, the sending means assigns one child Simple Object Access Protocol message enveloping the content of a segment to each of the segments, and sends each of the child Simple Object Access Protocol messages to the provider in accordance with a creation sequence of the segments.

1 Claim, 13 Drawing Sheets

OTHER PUBLICATIONS

Teraguchi et al. "A Stream-based Implementation of Web Services and Web Services Security," The 2004 Symposium on Cryptography and Information Security, copy collection of 2004 lecture, pp. 11-124.

* cited by examiner

FIG.17

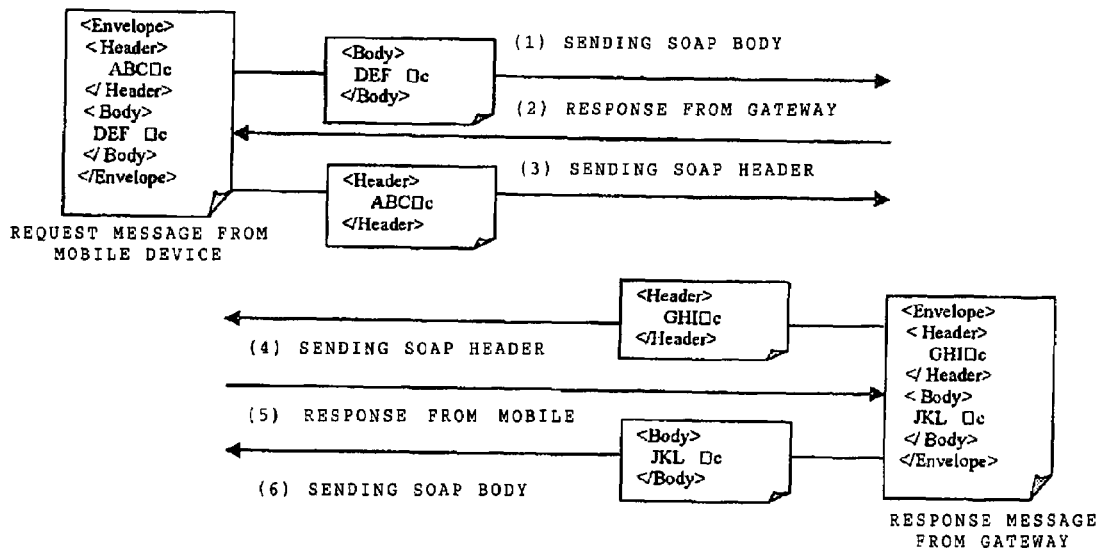

FIG.18

| RESPECTIVE PROCESSING FOR CONSTRUCTING MESSAGE TO BE TRANSMITTED | REQUIRED TIME (MILLISECONDS) |
|---|---|
| [TRANSMISSION 1] GENERATION OF SOAP BODY, MESSAGE ENCRYPTION | 1775.4 |
| [TRANSMISSION 2] KEY ENCRYPTION, DIGEST VALUE CALCULATION, SIGNATURE VALUE CALCULATION, SOAP HEADER GENERATION | 2843.0 |

| RESPECTIVE PROCESSING FOR CONSTRUCTING MESSAGE TO BE TRANSMITTED | REQUIRED TIME (MILLISECONDS) |
|---|---|
| [TRANSMISSION 1] GENERATION OF SOAP BODY, MESSAGE ENCRYPTION | 1775.4 |
| [TRANSMISSION 2] KEY ENCRYPTION, DIGEST VALUE CALCULATION, SIGNATURE VALUE CALCULATION, SOAP HEADER GENERATION | 2843.0 |

FIG.19

|  | REQUIRED TIME (MILLISECONDS) |
|---|---|
| [COMMUNICATION 1] ESTABLISHMENT OF COMMUNICATION AT FIRST TIME OF STARTING CELLULAR TELEPHONE APPLICATION | 7246.6 |
| [COMMUNICATION 2] ESTABLISHMENT OF COMMUNICATION AT SECOND TIME OR LATER AFTER STARTING APPLICATION | 2111.1 |
| SENDING MESSAGE | 1.065s |
| RECEIVING MESSAGE | 0.1339s |

FIG.20

|  | REQUIRED TIME (MILLISECONDS) |
|---|---|
| [COMMUNICATION 1] ESTABLISHMENT OF COMMUNICATION AT FIRST TIME OF STARTING CELLULAR TELEPHONE APPLICATION | 7246.6 |
| [COMMUNICATION 2] ESTABLISHMENT OF COMMUNICATION AT SECOND TIME OR LATER AFTER STARTING APPLICATION | 2111.1 |
| SENDING MESSAGE | 1.065s |
| RECEIVING MESSAGE | 0.1339s |

WEB SERVICE SIMPLE OBJECT ACCESS PROTOCOL REQUEST RESPONSE PROCESSING

FIELD OF THE INVENTION

The present invention relates to a Web Service system handling Simple Object Access Protocol (SOAP) messages, and also relates to a request means, a SOAP message intermediate processing unit, a method of processing a request SOAP message by the request means, a method of processing a response SOAP message by the request means, a method of processing a request SOAP message by the SOAP message intermediate processing unit, a method of processing a response SOAP message by the SOAP message intermediate processing unit, and a program, each concerning the Web Service system. More specifically, the present invention relates to a Web Service system in which improvements are made in SOAP message processing in a request means, and also relates to the request means, a SOAP message intermediate processing unit, a method of processing a request SOAP message by the request means, a method of processing a response SOAP message by the request means, a method of processing a request SOAP message by the SOAP message intermediate processing unit, a method of processing a response SOAP message by the SOAP message intermediate processing unit, and a program, each concerning the Web Service system.

BACKGROUND OF THE INVENTION

The following documents are considered herein:

[Non-Patent Document 1] International Business Machines Corporation (US), "Web Services Security (WS-Security)" [online], [searched on Apr. 1, 2004], the Internet <URL:

http://www-106.ibm.com/developerworks/webservices/library/ws-secure/>

[Non-Patent Document 2] M. Terauchi, Y. Yamaguchi, A. Nishikai, T. Itoh, "Lightweight Implementation of Web Services and Web Services Security by Serial Processing," "Symposium on Cryptography and Information Security" Collection of Manuscripts of Lecture at Institute in 2004, Jan. 27, 2004, pp. 119-124

Web Services security includes specifications targeted for application of digital signature or encryption to a SOAP message or for propagation of a security token (see Non-Patent Document 1). Here, consideration will be made on a case where a message with the Web Services security adopted thereto is sent from a mobile device to a server and a message from the server is received by the mobile device. According to Non-Patent Document 2, typical procedures on the mobile device side in this case are as follows.

(Construction (Generation) of Message)
Step 1: Construct a SOAP message
Step 2: Apply digital signature and encryption to the SOAP message
Step 3: Construct a SOAP header including information necessary for verifying the digital signature and for decrypting the encrypted value, a security token, and the like, and insert the information into the SOAP message (Communication)
Step 1: Establish communication with a server
Step 2: Send the SOAP message to the server
Step 3: Receive the SOAP message from the server
Step 4: Terminate the communication with the server (Decrypting Received Message)
Step 1: Decrypt a SOAP header located in the received SOAP message and accumulate information necessary for verifying digital signature and for decrypting the encrypted value
Step 2: Perform verification of the digital signature and decryption of the encrypted value in accordance with the order of description of the SOAP header
Step 3: Upon completion of the verification and decryption, extract a response from the server in the SOAP message and return the response to an application Speeding up of the Web Service is an important issue not only for mobile devices but also for servers side. As a conventional technique for improving this issue, streaming XML processing is conceivable as disclosed in Non-Patent Document 2. However, there are also other factors left concerning long processing time except the XML processing. Accordingly, the problem of speeding up the Web Service has not yet been resolved completely. To be more precise, (a) calculation of a signature value in transmission of a message, and (b) decryption of a key upon reception of a message account for a very large portion of the processing time for security computation. Moreover, communication processing also accounts for a very large portion in the case of a wireless device.

Security processing by a pervasive device tends to require a very large amount of calculation time due to constraints of hardware, and of programming languages and the like. According to measurement conducted by a partner division of the inventors, it is learned that (a) calculation of the signature value by a sender side using a public key method, and (b) decryption of an encrypted value by a receiver side using the public key method, in particular, require the calculation time of several seconds for each step of processing.

Moreover, it is also known that a wireless device has a specific problem of consumption of a large amount of time in communication. As a result of measurement by the inventors, it is apparent that establishment of communication with a server, and processing for transmission and reception of a message require the processing time of several seconds to nearly a dozen or so seconds in total.

As a result of simple calculation using these values, when the Web Services security is adopted to a mobile device, the above-described procedures of (Construction (generation) of message), (Communication), and (Decrypting received message) require the total time in the range from about 15 to 30 seconds. Accordingly, it is apparent that speeding up thereof is an important issue.

SUMMARY OF THE INVENTION

An object of the present invention is to provide a Web Service system, a request means, a SOAP message intermediate processing unit, a method of processing a request SOAP message by the request means, a method of processing a response SOAP message by the request means, a method of processing a request SOAP message by the SOAP message intermediate processing unit, a method of processing a response SOAP message by the SOAP message intermediate processing unit, and a program, each of which is capable of reducing time for processing a request SOAP message by a request means in a mobile device or the like.

Another object of the present invention is to provide a Web Service system, a request means, a SOAP message intermediate processing unit, a method of processing a request SOAP message by the request means, a method of processing a response SOAP message by the request means, a method of processing a request SOAP message by the SOAP message intermediate processing unit, a method of processing a response SOAP message by the SOAP message intermediate processing unit, and a program, each of which is capable of reducing time for processing a response SOAP message by a request means in a mobile device or the like.

In a Web Service system for request processing of the present invention, a request means and a provider are respectively configured to send a request and a response concerning a Web Service to the other through the Internet by means of a SOAP message. The Web Service system for request processing includes a SOAP message intermediate processing unit which relays a SOAP message from the request means to the provider.

The request means in the Web Service system for request processing of the present invention includes: sequence definition means for defining, as a defined sequence, a segment sequence when one SOAP message (hereinafter referred to as a "parent SOAP message") as one request concerning a Web Service is divided into a plurality of segments based on a predetermined division criterion; segment creation means for creating a content of each of the segments of the one parent SOAP message in accordance with the defined sequence; and sending means for executing sending processing in parallel with creation processing by the segment creation means, in which one SOAP message (hereinafter referred to as a "child SOAP message") containing the content of one segment is assigned to each of the segments, and for sending each of the child SOAP messages to the provider in accordance with a creation sequence of the contents of the segments.

According to the present invention, one SOAP message (parent SOAP message) as one request in a Web Service is divided into a plurality of segments, and one SOAP message (child SOAP message) enveloping the content of one segment is assigned to each of the segments. A request means does not send the parent SOAP message to a provider after creating it, but sends the child SOAP messages in accordance with the creation sequence of the contents of the segments, in parallel with the creating processing. Accordingly, it is possible to reduce time taken from the start of creating a request SOAP message to the completion of sending the request SOAP message in the request means.

According to the present invention, one SOAP message (parent SOAP message) as one response from a provider is divided into a plurality of segments, and one SOAP message (child SOAP message) enveloping the content of one segment is assigned to each of the segments. A request means does not decrypt the parent SOAP message after receiving it, but decrypts the child SOAP messages which have been received or are being received while the request means is receiving the child SOAP messages. Accordingly, it is possible to reduce time taken from the start of receiving a response SOAP message to the completion of processing the response SOAP message in the request means.

BRIEF DESCRIPTION OF THE DRAWINGS

For a more complete understanding of the present invention and the advantages thereof, reference is now made to the following description taken in conjunction with the accompanying drawings, in which:

FIG. 17 shows a simply divided message which is permitted in conformity with the JSR172;

FIG. 18 is an example of a view showing time measured in Data 1;

FIG. 19 is an example of a view showing time measured in Data 2; and

FIG. 20 is an example of a view showing time required for sending and receiving a predetermined SOAP message, which is calculated based on the time measured.

DETAILED DESCRIPTION OF THE INVENTION

Figure 1:
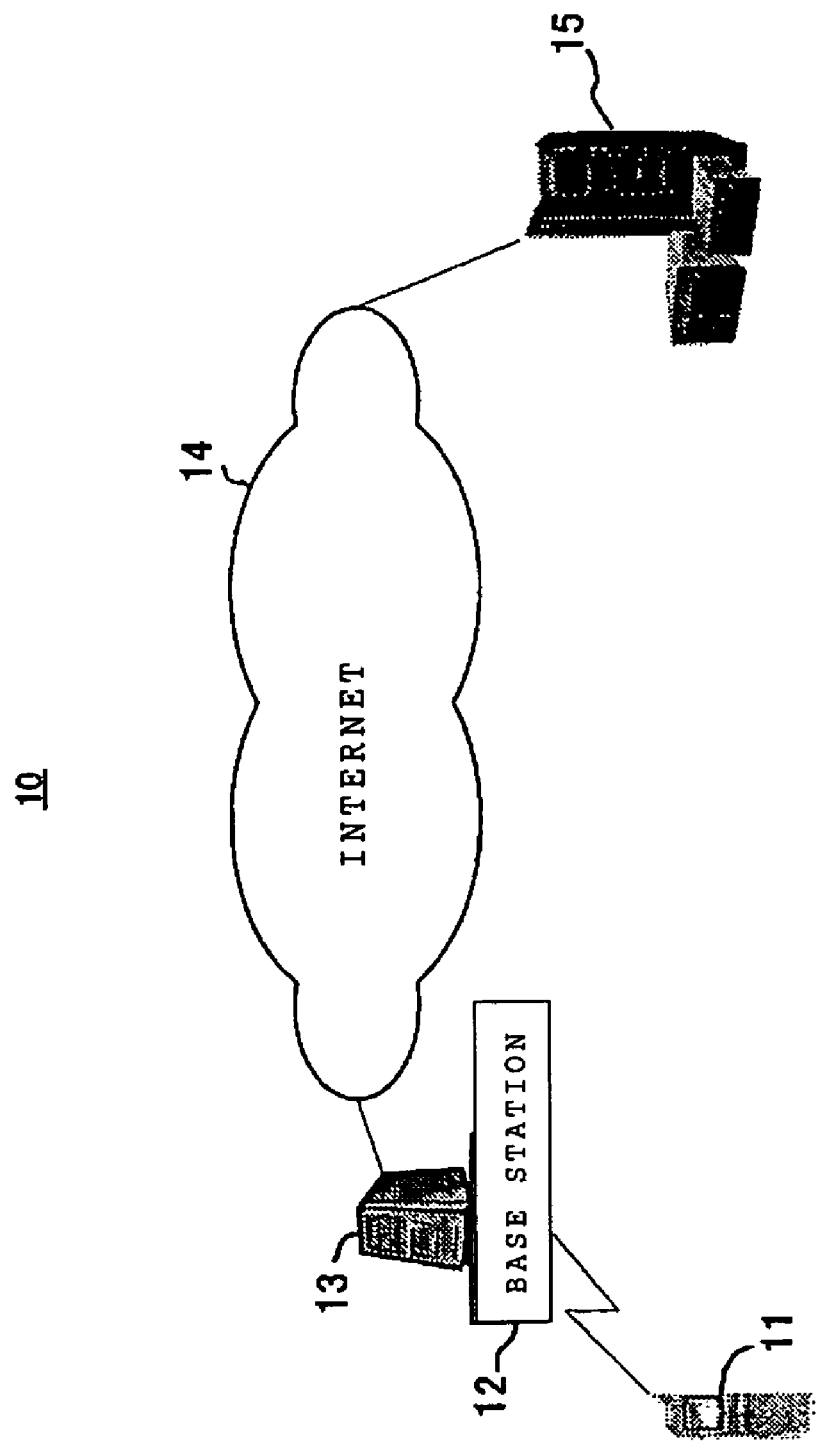
FIG. 1 is a schematic diagram of a Web Service system.

The present invention provides a Web Service system, a request means, a SOAP message intermediate processing unit, a method of processing a request SOAP message by the request means, a method of processing a response SOAP message by the request means, a method of processing a request SOAP message by the SOAP message intermediate processing unit, a method of processing a response SOAP message by the SOAP message intermediate processing unit, and a program, each of which is capable of reducing time for processing a request SOAP message by a request means in a mobile device or the like. The term requester and request means are used interchangeably herein.

The present invention also provides a Web Service system, a request means, a SOAP message intermediate processing unit, a method of processing a request SOAP message by the request means, a method of processing a response SOAP message by the request means, a method of processing a request SOAP message by the SOAP message intermediate processing unit, a method of processing a response SOAP message by the SOAP message intermediate processing unit, and a program, each of which is capable of reducing time for processing a response SOAP message by a request means in a mobile device or the like.

In a Web Service system for request processing of the present invention, a request means and a provider are respectively configured to send a request and a response concerning a Web Service to the other through the Internet by means of a SOAP message. The Web Service system for request processing includes a SOAP message intermediate processing unit which relays a SOAP message from the request means to the provider.

The request means in the Web Service system for request processing of the present invention includes: sequence definition means for defining, as a defined sequence, a segment sequence when one SOAP message (hereinafter referred to as a "parent SOAP message") as one request concerning a Web Service is divided into a plurality of segments based on a predetermined division criterion; segment creation means for creating a content of each of the segments of the one parent SOAP message in accordance with the defined sequence; and sending means for executing sending processing in parallel with creation processing by the segment creation means, in which one SOAP message (hereinafter referred to as a "child SOAP message") containing the content of one segment is assigned to each of the segments, and for sending each of the child SOAP messages to the provider in accordance with a creation sequence of the contents of the segments.

The SOAP message intermediate processing unit of the Web Service system for request processing of the present invention includes: receiving means for receiving the child SOAP messages concerning the one parent SOAP message from the request means; parent SOAP message generation means for generating a parent SOAP message based on the child SOAP messages after receiving all of the child SOAP messages concerning the one parent SOAP message; and sending means for sending the generated parent SOAP message to the provider.

In a Web Service system for response processing of the present invention, a request means and a provider are respectively configured to send a request and a response concerning a Web Service to the other through the Internet by means of a SOAP message. The Web Service system for response processing includes a SOAP message intermediate processing unit which relays a SOAP message from the provider to the request means.

The SOAP message intermediate processing unit of the Web Service system for response processing of the present invention includes: sequence definition means for defining, as a defined sequence, a segment sequence when one SOAP message (=the "parent SOAP message") as one response concerning a Web Service is divided into a plurality of segments based on a predetermined division criterion; child SOAP message generation means for assigning one SOAP message (=the "child SOAP message") containing a content of one segment to each of the segments and thereby generating each of the child SOAP messages; and sending means for sending each of the child SOAP messages to the request means in accordance with the defined sequence of the segments corresponding to the child SOAP messages.

The request means in the Web Service system for response processing of the present invention includes: receiving means for receiving the child SOAP messages; and decryption processing means for executing decryption processing in parallel with receiving processing by the receiving means, in which each of the child SOAP messages is decrypted in accordance with a reception sequence of the child SOAP messages.

A request means with a method of processing a request SOAP message of the present invention adopted thereto is configured to send a request concerning a Web Service to a provider through the Internet and to receive a response concerning the Web Service from the provider through the Internet. The method of processing a request SOAP message of the present invention to be adopted to the request means includes the steps of: defining, as a defined sequence, a segment sequence when one SOAP message (=the "parent SOAP message") as one request concerning a Web Service is divided into a plurality of segments based on a predetermined division criterion; creating a content of each of the segments of the parent SOAP message in accordance with the defined sequence; and executing sending processing in parallel with processing of creating the content of each of the segments, in which one SOAP message (=the "child SOAP message") containing the content of one segment is assigned to each of the segments and sending each of the child SOAP messages to the provider in accordance with a creation sequence of the contents of the segments.

A request means with a method of processing a response SOAP message of the present invention adopted thereto is configured to send a request concerning a Web Service to a provider through the Internet and to receive a response concerning the Web Service from the provider through the Internet. The method of processing a response SOAP message of the present invention to be adopted to the request means includes the steps of: receiving each of SOAP messages (=the "child SOAP messages") in accordance with a predetermined defined sequence, one child SOAP message being assigned to each of a plurality of segments into which one SOAP message (=the "parent SOAP message") as one response concerning a Web Service is divided; and decrypting each of the child SOAP messages in accordance with a reception sequence of the child SOAP messages, in parallel with the step of receiving each of the child SOAP messages.

In a SOAP message intermediate processing unit with a method of processing a request SOAP message of the present invention adopted thereto, a request means and a provider are respectively configured to send a request and a response concerning a Web Service to the other through the Internet by means of a SOAP message, and the SOAP message intermediate processing unit is configured to relay a SOAP message from the request means to the provider. The method of processing a request SOAP message of the present invention to be adopted to the SOAP message intermediate processing unit includes the steps of: receiving each of SOAP messages (=the "child SOAP messages"), each containing a content of one of a plurality of segments into which one SOAP message (=the "parent SOAP message") as one request concerning a Web Service is divided; generating a parent SOAP message based on the child SOAP messages after receiving all of the child SOAP messages concerning the one parent SOAP message; and sending the generated parent SOAP message to the provider.

In a SOAP message intermediate processing unit with a method of processing a response SOAP message of the present invention adopted thereto, a request means and a provider are respectively configured to send a request and a response concerning a Web Service to the other through the Internet by means of a SOAP message, and the SOAP message intermediate processing unit is configured to relay a SOAP message from the provider to the request means. The method of processing a response SOAP message of the present invention to be adopted to the SOAP message intermediate processing unit includes the steps of: defining, as a defined sequence, a segment sequence when one SOAP message (=the "parent SOAP message") as one response sent from the provider to the request means is divided into a plurality of segments based on a predetermined division criterion; generating one SOAP message (=the "child SOAP message") containing a content of one segment, for each of the segments; and sending each of the child SOAP messages to the request means in accordance with the defined sequence of the segments corresponding to the child SOAP messages.

A program of the present invention causes a computer to function as each of the above-described means in the request means. A program of the present invention also causes a computer to function as each of the above-described means in the SOAP message intermediate processing unit.

According to the present invention, one SOAP message (parent SOAP message) as one request in a Web Service is divided into a plurality of segments, and one SOAP message (child SOAP message) enveloping the content of one segment is assigned to each of the segments. A request means does not send the parent SOAP message to a provider after creating it, but sends the child SOAP messages in accordance with the creation sequence of the contents of the segments, in parallel with the creating processing. Accordingly, it is possible to reduce time taken from the start of creating a request SOAP message to the completion of sending the request SOAP message in the request means.

According to the present invention, one SOAP message (parent SOAP message) as one response from a provider is divided into a plurality of segments, and one SOAP message (child SOAP message) enveloping the content of one segment is assigned to each of the segments. A request means does not decrypt the parent SOAP message after receiving it, but decrypts the child SOAP messages which have been received or are being received while the request means is receiving the child SOAP messages. Accordingly, it is possible to reduce time taken from the start of receiving a response SOAP message to the completion of processing the response SOAP message in the request means.

FIG. 1 is a schematic diagram of a Web Service system 10. A request means 11 which is a cellular telephone, for example, sends and receives data through radio transmission to and from a base station 12, which takes charge of a zone where the request means 11 is currently located and belongs to a cellular telephone carrier for whom a user of the request means 11 signs up. In a typical cellular telephone carrier, a gateway 13 is provided for each base station 12 or for each group consisting of a plurality of base stations 12, and the gateway 13 connects the request means 11 and the Internet 14 to each other. Alternatively, it is also conceivable that a first level gateway 13 is provided for each base station 12 while a second level gateway 13 is provided for each group consisting of a plurality of base stations 12, and that the request means 11 is connected to the Internet 14 through the plurality of levels of gateways 13. A SOAP message intermediate processing unit 24 (FIG. 4) to be described later may be installed in any of the gateways 13 at any levels interposed between each of the request means 11 and the Internet 14. A provider 15 of a Web Service as a server is connected to the Internet 14 in a different location from the gateway 13.

Figure 2:
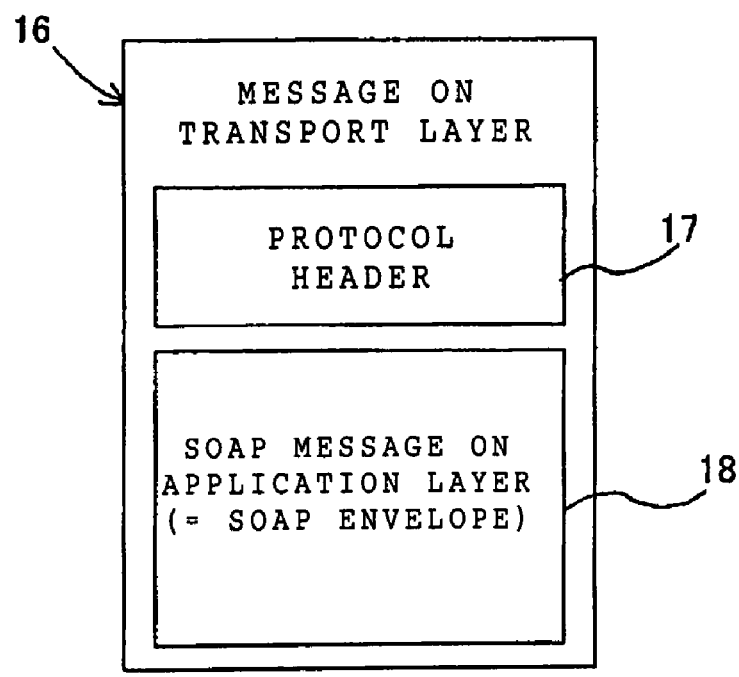
FIG. 2 is an example of a block diagram of a message on a transport layer used for sending and receiving a SOAP message.

FIG. 2 is a block diagram of a message on a transport layer used for sending and receiving a SOAP message 18. A message 16 on a transport layer includes a protocol header 17 of a protocol such as HTTP, and a SOAP message 18 on an application layer. The SOAP message 18 on the application layer is also referred to as a "SOAP envelope." In the present invention, a simple statement of "SOAP message" represents the SOAP message 18 as the SOAP envelope.

Figure 3:
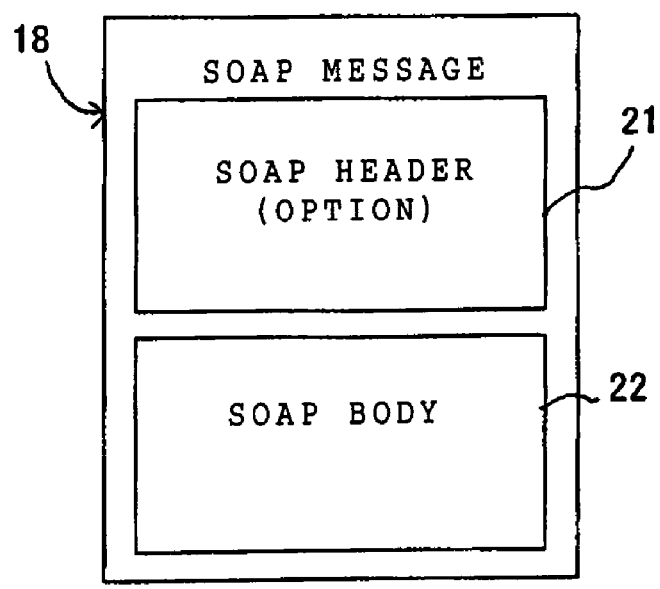
FIG. 3 is an example of a block diagram of the SOAP message.

FIG. 3 is a block diagram of the SOAP message 18. The SOAP message 18 includes a SOAP header 21 and a SOAP body 22. Both of the SOAP header 21 and the SOAP body 22 are written in the extensible Markup Language (XML). The SOAP header 21 is optional and omissible. However, in the SOAP message 18 addressing Web Services security, information on a security token and digital signature is written in the SOAP header 21.

Figure 4:
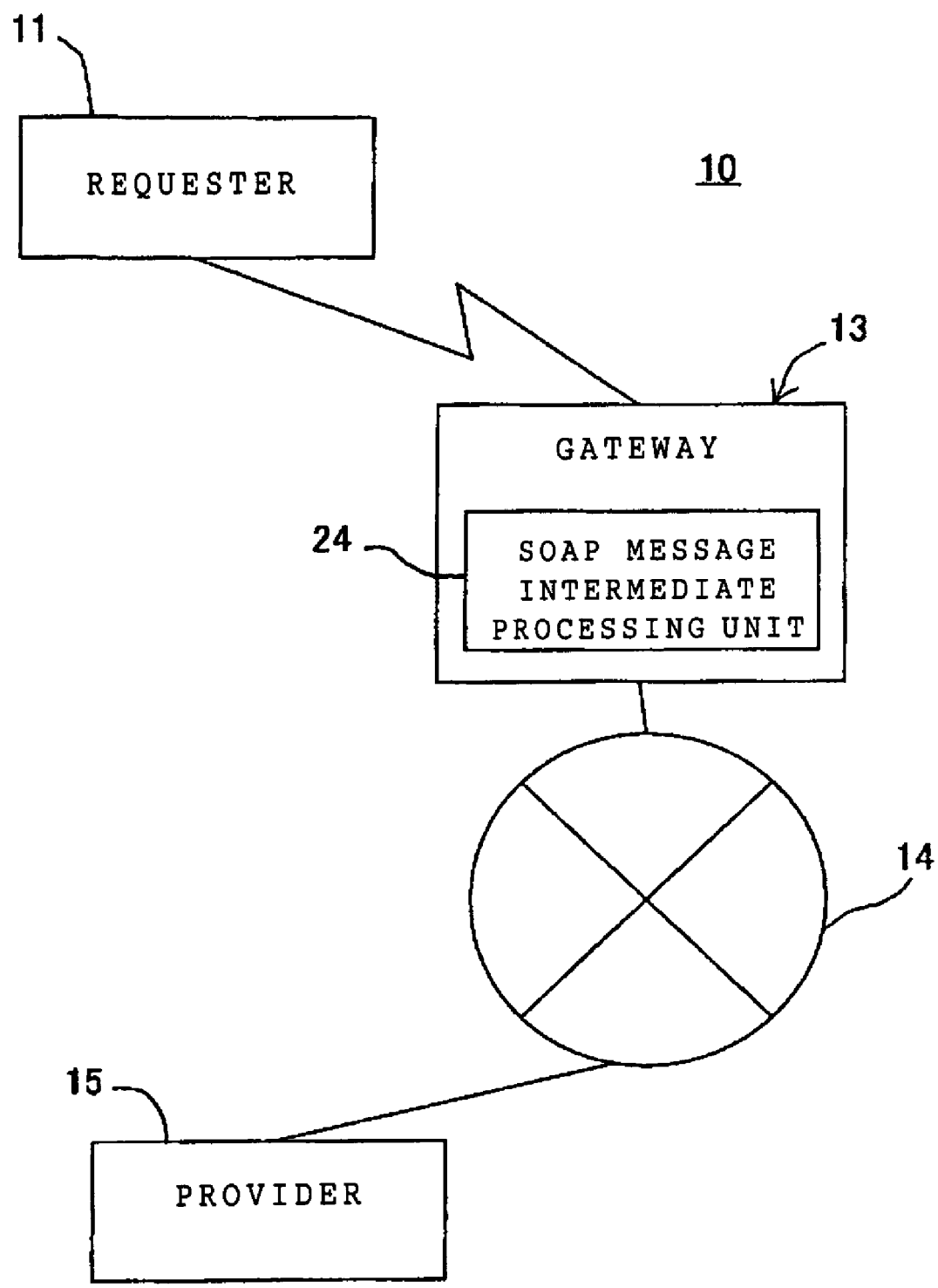
FIG. 4 is an example of a functional block diagram of the Web Service system when an SOAP message intermediate processing unit is installed in a gateway.
Figure 5:
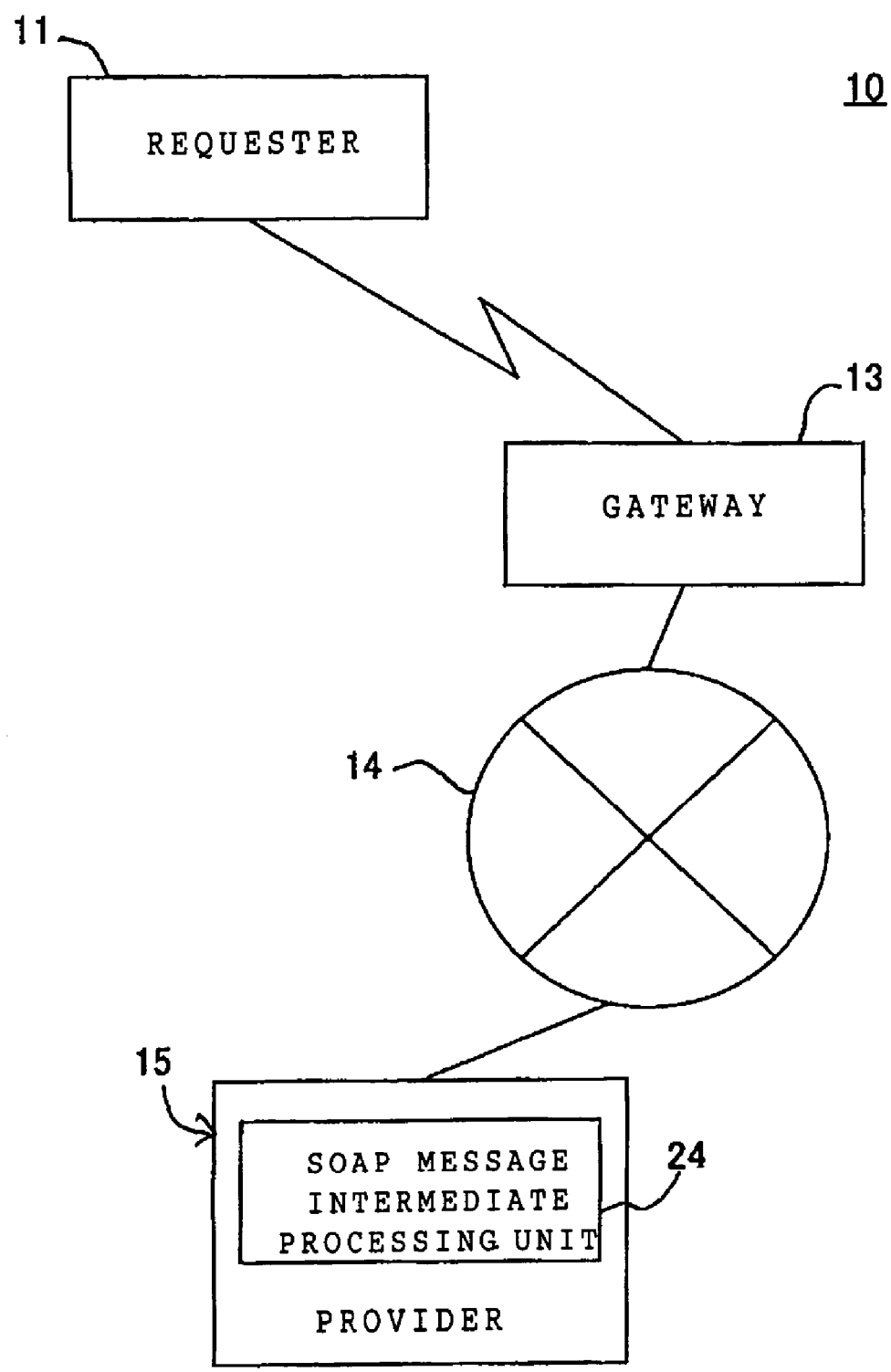
FIG. 5 is an example of a functional block diagram of the Web Service system when the SOAP message intermediate processing unit is installed in a provider.

FIG. 4 is a functional block diagram of the Web Service system 10 when the SOAP message intermediate processing unit 24 is installed in the gateway 13, and FIG. 5 is a functional block diagram of the Web Service system 10 when the SOAP message intermediate processing unit 24 is installed in the provider 15. The Web Service system 10 includes the request means 11, the provider 15, and the SOAP message intermediate processing unit 24. The request means 11 and the provider 15 respectively transmit a request and a response concerning the Web Service in the form of the SOAP message to the counterpart through the Internet 14. The SOAP message intermediate processing unit 24 relays the SOAP message from the request means 11 to the provider 15 and the SOAP message from the provider 15 to the request means 11. Although the SOAP message intermediate processing unit 24 is typically installed in the gateway 13, it may be installed in the provider 15 instead.

Figure 6:
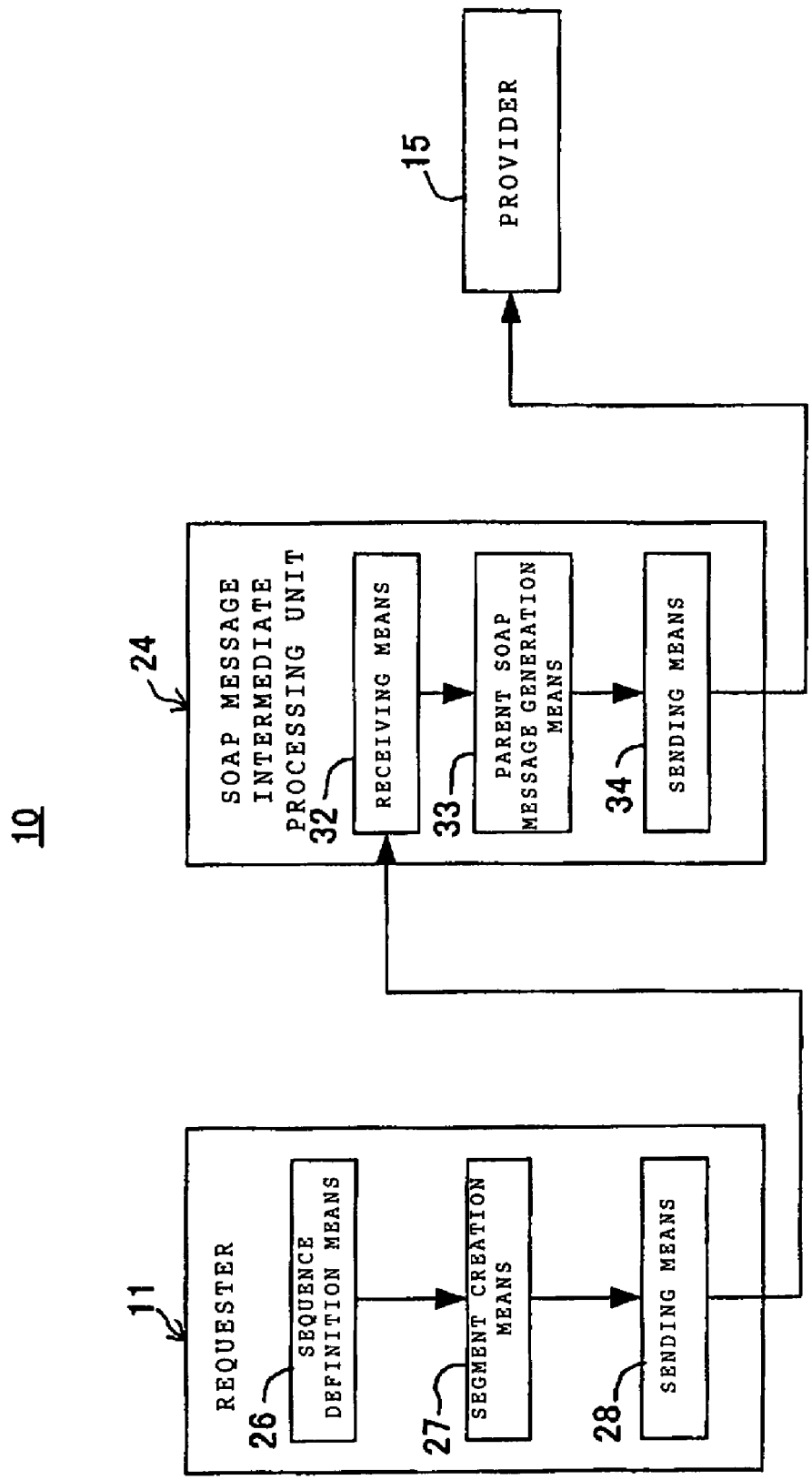
FIG. 6 is an example of a functional block diagram of portions in the Web Service system which concern request processing.

FIG. 6 is a functional block diagram of portions in the Web Service system 10 which concern request processing. The request means 11 includes sequence definition means 26, segment creation means 27, and sending means 28. The sequence definition means 26 defines a segment sequence as a defined sequence when one SOAP message (=a "parent SOAP message") as one request concerning the Web Service is divided into a plurality of segments based on a predetermined division criterion. The segment creation means 27 creates a content of each of the segments of the parent SOAP message in accordance with the defined sequence. The sending means 28 executes sending processing in parallel with creation processing by the segment creation means 27, in which one SOAP message (=a "child SOAP message") containing the content of one segment is assigned to each of the segments, and sends each of the child SOAP messages to the provider 15 in accordance with a creation sequence of the contents of the segments. The SOAP message intermediate processing unit 24 includes receiving means 32, parent SOAP message generation means 33, and sending means 34. The receiving means 32 receives the child SOAP messages concerning the one parent SOAP message from the Web Service system 10. The parent SOAP message generation means 33 generates a parent SOAP message based on the child SOAP messages after receiving all of the child SOAP messages concerning the one parent SOAP message. The sending means 34 sends the generated parent SOAP message to the provider 15.

It has been explained above that the one parent SOAP message in the request processing is equivalent to one SOAP message as one request concerning the Web Service. This explanation means that the one parent SOAP message constitutes one request unit. Therefore, while the one parent SOAP message is divided into the plurality of segments and the one child SOAP message containing the content of a segment is assigned to each of the segments, each of the child SOAP messages alone cannot constitute one request unit.

In a conventional request means, the parent SOAP message is sent after the parent SOAP message has been generated. On the contrary, as the parent SOAP message is divided into the plurality of segments in the request means 11, it is possible to perform parallel processing of creation of the segments by the segment creation means 27 and sending the child SOAP messages by the sending means 28. Accordingly, it is possible to reduce time for processing the request by the request means 11.

Figure 7:
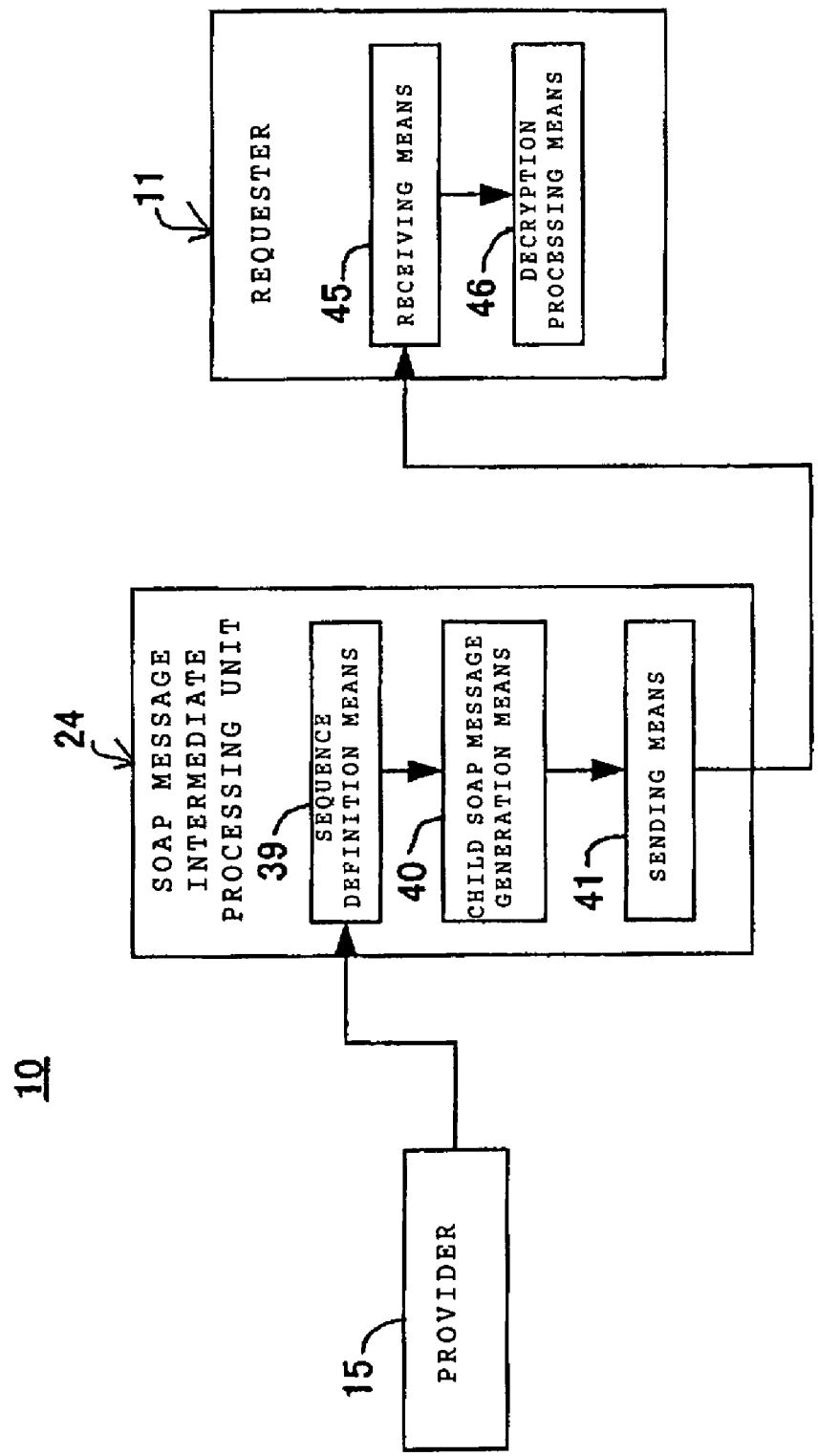
FIG. 7 is an example of a functional block diagram of portions in the Web Service system which concern response processing.

FIG. 7 is a functional block diagram of portions in the Web Service system 10 which concern response processing. The SOAP message intermediate processing unit 24 includes sequence definition means 39, child SOAP message generation means 40, and sending means 41. The sequence definition means 39 defines a segment sequence as a defined sequence when one SOAP message (=the "parent SOAP message") as one request concerning the Web Service is divided into a plurality of segments based on a predetermined division criterion. The child SOAP message generation means 40 assigns one SOAP message (=the "child SOAP message") containing a content of one segment to each of the segments and thereby generates each of the child SOAP messages. The sending means 41 sends each of the child SOAP messages to the request means 11 in accordance with the defined sequence of the segments corresponding to the child SOAP messages. The request means 11 includes receiving means 45 and decryption processing means 46. The receiving means 45 receives the child SOAP messages. The decryption processing means 46 executes decryption processing in parallel with receiving processing by the receiving means 45, and decrypts each of the child SOAP messages in accordance with a reception sequence of the child SOAP messages.

It has been explained above that the one parent SOAP message in the response processing is equivalent to one SOAP message as one response concerning the Web Service. This explanation means that the one parent SOAP message constitutes one response unit. Therefore, while the one parent SOAP message is divided into the plurality of segments and the one child SOAP message containing the content of a segment is assigned to each of the segments, each of the child SOAP messages alone cannot constitute one response unit.

In the conventional request means, the parent SOAP message performs decryption processing after the parent SOAP message has been received. On the contrary, since the request means 11 receives the child SOAP messages corresponding to the divided segments of the SOAP message concerning the response in a unit of a child SOAP message, it is possible to perform parallel processing of reception of the child SOAP messages by the receiving means 45 and of decrypting the child SOAP messages by the decryption processing means 46. As a result, it is possible to reduce time for processing the response by the request means 11.

The following describes examples of more concrete configurations of the Web Service system 10. These configuration examples can be adopted to the Web Service system 10, the request means 11, and the SOAP message intermediate processing unit 24 described above in arbitrary combinations.

The request means 11 may be a cellular telephone, a private digital assistant (PDA), a robot in a house or in a factory, a home information appliance, or a car navigation system, for example. The request means 11 may generally include all kinds of electronic devices which do not have a sufficient CPU capacity for processing the SOAP message concerning the request at high speed and are connectable to the provider 15 through the gateway 13. The request means 11 may be a notebook personal computer (PC). The request means 11 at least subsumes pervasive devices.

The predetermined division criterion typically corresponds to division of the parent SOAP message into two segments, in which a first segment represents all the description of the SOAP header 21 and a second segment represents all the description of the SOAP body 22. However, it is also possible to divide the parent SOAP message into three or more segments according to a division criterion in which each of the SOAP header 21 and the SOAP body 22 of the parent SOAP message is made into at least one segment. In the defined sequence by the sequence definition means 26 (FIG. 6) of the request means 11 concerning the request processing, the SOAP header 21 is placed behind the SOAP body 22. In the defined sequence by the sequence definition means 39 (FIG. 7) of the SOAP message intermediate processing unit 24 concerning the response processing, the SOAP header 21 is placed in front of the SOAP body 22. For example, an assumption will be made here that the SOAP header 21 of the parent SOAP message is divided into a plurality of segments of H1, H2, H3, ..., Hn and the SOAP body 22 of the parent SOAP message is divided into a plurality of segments of B1, B2, B3, ..., Bm (here, n and m are natural numbers and n≠m is acceptable). The defined sequence by the sequence definition means 26 may be (a) B1→B2→B3→ ... →Bm→H1→H2→H3→ ... →Hn, or (b) B1→H1→B2→H2→B3→H3→ ..., for example. The defined sequence by the sequence definition means 39 may be (c) H1→H2→H3→ ... →Hn→B1→B2→B3→ ... →Bm, or (d) H1→B1→H2→B2→H3→B3 ..., for example. For convenience in explanation, the segments including only the header of the parent SOAP message and the segments including only the body of the parent SOAP message will be hereinafter referred to as header segments and body segments, respectively. In the defined sequences (a) and (c), the entire body segments and the entire header segments are placed in front of the entire header segments and the entire body segments respectively. On the contrary, in the defined sequences (b) and (d), the header segments and the body segments alternate. Here, in terms of the defined sequences (b) and (d), each of the pairs of H1 and B1, H2 and B2, H3 and B3 ... preferably regulates a relation between a header segment of a reference source and a body of a referent, and the like. In the request processing of the Web Service system 10, creation of the segments by the segment creation means 27 and transmission of the child SOAP messages by the sending means 28 are executed in parallel. Meanwhile, in the response processing of the Web Service system 10, reception of the child SOAP messages by the receiving means 45 and decryption processing of the child SOAP messages by the decryption processing means 46 are executed in parallel. In short, the division criterion of the parent SOAP message and the defined sequence should be set appropriately to minimize the total time required for such parallel processing.

As is understood from FIG. 16 to be described later, the header segments constitute headers in the child SOAP messages, and the body segments constitute bodies in the child SOAP messages. The contents of the child SOAP messages when dividing the header of the parent SOAP message into the plurality of segments will be described in terms of the following example of the parent SOAP message. Note that three digits on the left represent line numbers, which are inserted for convenience in explanation.

(Parent SOAP message)

```
200: ...
201: <Header>
202:   <L1a>
```

```
                (Parent SOAP message)

203:      <L2a1>
        204:         ...
        205:      </L2a1>
        206:      <L2a2>
        207:         ...
        208:      </L2a2>
        209:    </L1a>
        210:    <L1b>
        211:      <L2b1>
        212:         ...
        213:      </L2b1>
        214:      <L2b2>
        215:         ...
        216:      </L2b2>
        217:    </L1b>
        218:</Header>
        219:...
```

In the header of the parent SOAP message described above, L2 descriptions representing two levels lower than the root are used as a divisional level, and the header is divided into three segments. A first segment ranges from the line numbers 203 to 208, a second segment ranges from the line numbers 211 to 213, and a third segment ranges from the line numbers 214 to 216. In this case, the headers of the respective child SOAP messages will be described as follows. Here, according to the SOAP protocol, the header is omissible but the body is not omissible. Accordingly, the description representing the body in each of the child SOAP messages will be written as <Body></Body>, which means an empty body.

```
                (Child SOAP message 1)

240:...
        241:<Header>
        242:    <L1a>
        243:      <L2a1>
        244:         ...
        245:      </L2a1>
        246:      <L2a2>
        247:         ...
        248:      </L2a2>
        249:    </L1a>
        250:</Header>
        251:...
                (Child SOAP message 2)

260:...
        261:<Header>
        262:    <L1b>
        263:      <L2b1>
        264:         ...
        265:      </L2b1>
        266:    </L1b>
        267:</Header>
        268:...
                (Child SOAP message 3)

280:...
        281:<Header>
        282:    <L1b>
        283:      <L2b2>
        284:         ...
        285:      </L2b2>
        286:    </L1b>
        287:</Header>
        288:...
```

That is to say, the header in each of the child SOAP messages includes all the elements on and below the divisional level in the segment, and also includes all element names of upper levels from which the segment hang in a tree structure.

The parent SOAP message is a SOAP message with the Web Services security adopted thereto. In the SOAP message 18 with the Web Services security adopted thereto concerning the request, the SOAP body 22 is encrypted with a symmetric key. Meanwhile, the SOAP header 21 is encrypted with the public key of the provider 15 after the information concerning the security token, the digital signature, and the symmetric key is written therein. In the case of creating the SOAP message with the Web Services security adopted thereto, the request means 11 having an insufficient CPU capacity such as the cellular telephone requires a long time for the creation processing of the SOAP message 18. Accordingly, the SOAP message 18 described above is divided into the segments of the SOAP header 21 and the SOAP body 22, and the segment concerning the SOAP header 21 is created while using a period of sending the segment concerning the SOAP body 22 in the form of child SOAP messages. In this way, the time for processing the request by the request means 11 is reduced. Similarly, in terms of the SOAP message 18 with the Web Services security adopted thereto concerning the response, information necessary for decrypting the SOAP body 22 is written in the SOAP header 21, and the SOAP header 21 and the SOAP body 22 are encrypted by the symmetric key. In the response processing, the request means 11 receives the child SOAP messages concerning the SOAP header 21 in advance, and decrypts the child SOAP messages concerning the SOAP header 21 in the course of receiving the child SOAP messages concerning the SOAP body 22. In this way, the request means 11 can promptly decrypt the SOAP message concerning the SOAP body 22 upon reception thereof. Accordingly, the time for processing the response by the request means 11 is reduced.

A stream type protocol is applicable to the processing by the request means 11. In the case of the request means 11 applying a normal (non-stream type) protocol, in the processing concerning the request (FIG. 6), the sending means 28 starts the sending processing by use of the child SOAP messages concerning the segments which have been already created by the segment creation means 27. Meanwhile, in the processing concerning the response (FIG. 7), the decryption processing means 46 performs decryption processing of the child SOAP messages which have been completely received. On the contrary, in the request means 11 with the stream type protocol adopted thereto, in the processing concerning the request (FIG. 6), the sending means 28 sequentially sends portions of the segments sequentially sent from the segment creation means 27, which are in the course of creation by the segment creation means 27 and are therefore only partially created. Meanwhile, in the processing concerning the response (FIG. 7), the decryption processing means 46 sequentially decrypts the portions of the segments of the child SOAP messages in the course of the reception, which are sequentially outputted from the receiving means 45, in a unit of predetermined bytes similarly to an interpreter in a language processor.

Figure 8:
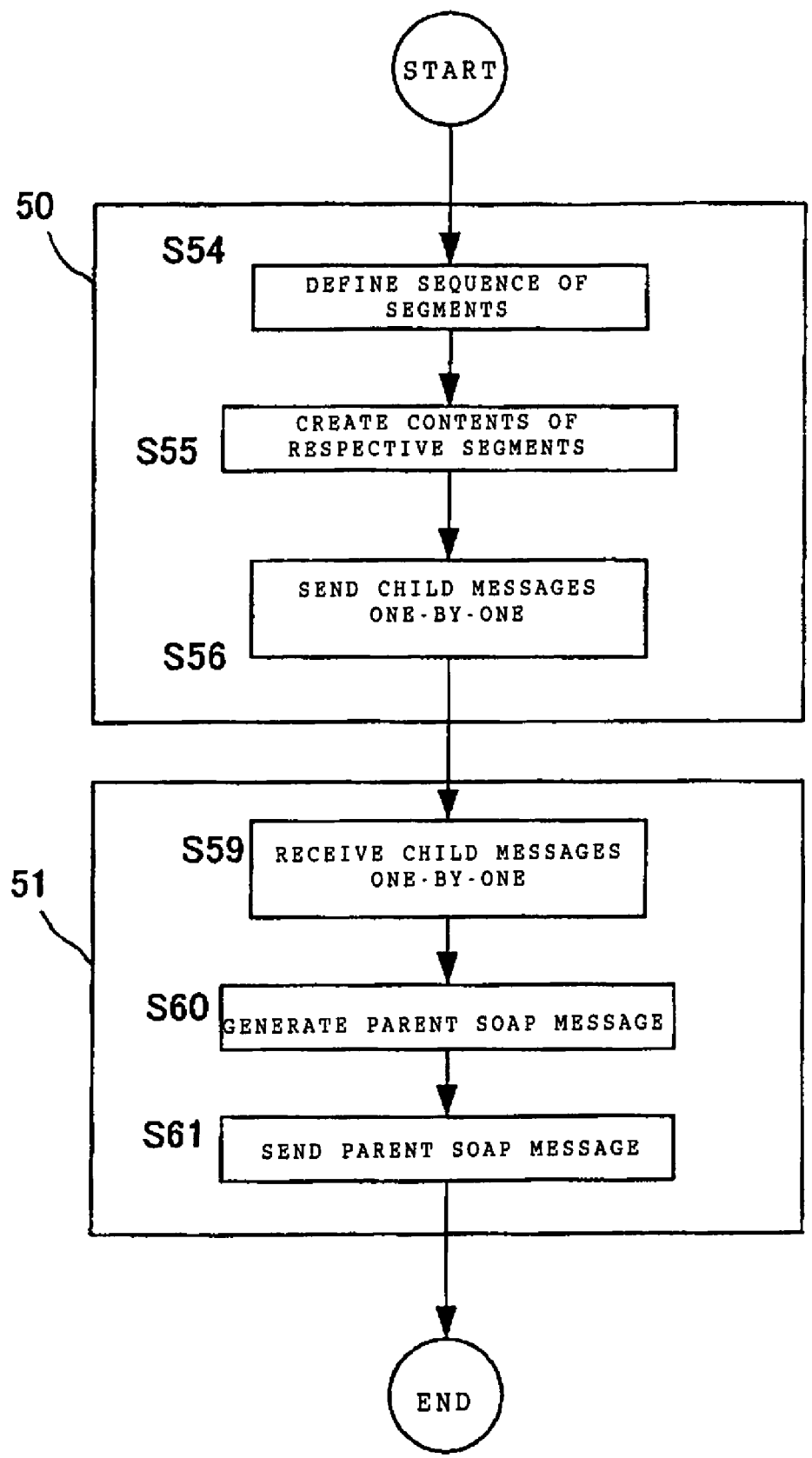
FIG. 8 is an example of a flowchart of a method of processing a request SOAP message which is an example of applied to the Web Service system.

FIG. 8 is a flowchart of a method of processing a request SOAP message which is applied to the Web Service system 10. The method of processing a request SOAP message includes a method portion 50 to be executed by the request means 11, and a method portion 51 to be executed by the SOAP message intermediate processing unit 24. The method portion 50 includes Steps S54, S55, and S56, and the method portion 51 includes Steps S59, S60, and S61. In Step S54, the segment sequence when one SOAP message (=the "parent SOAP message") as one request concerning the Web Service is divided into a plurality of segments based on a predetermined division criterion is defined as a defined sequence. In Step S55, a content of each of the segments of the parent SOAP message is created in accordance with the defined sequence. In Step S56, sending processing is executed in parallel with the processing of creating the content of each of the segments. That is to say, one SOAP message (=the "child SOAP message") containing the content of one segment is assigned to each of the segments, and each of the child SOAP messages is sent to the provider 15 in accordance with a creation sequence of the contents of the segments. In Step S59, the child SOAP messages from the request means 11 are received. In Step S60, the parent SOAP message is generated based on the child SOAP messages after all the child SOAP messages concerning the one parent SOAP message are received. In Step S61, the generated parent SOAP message is sent to the provider 15.

Figure 9:
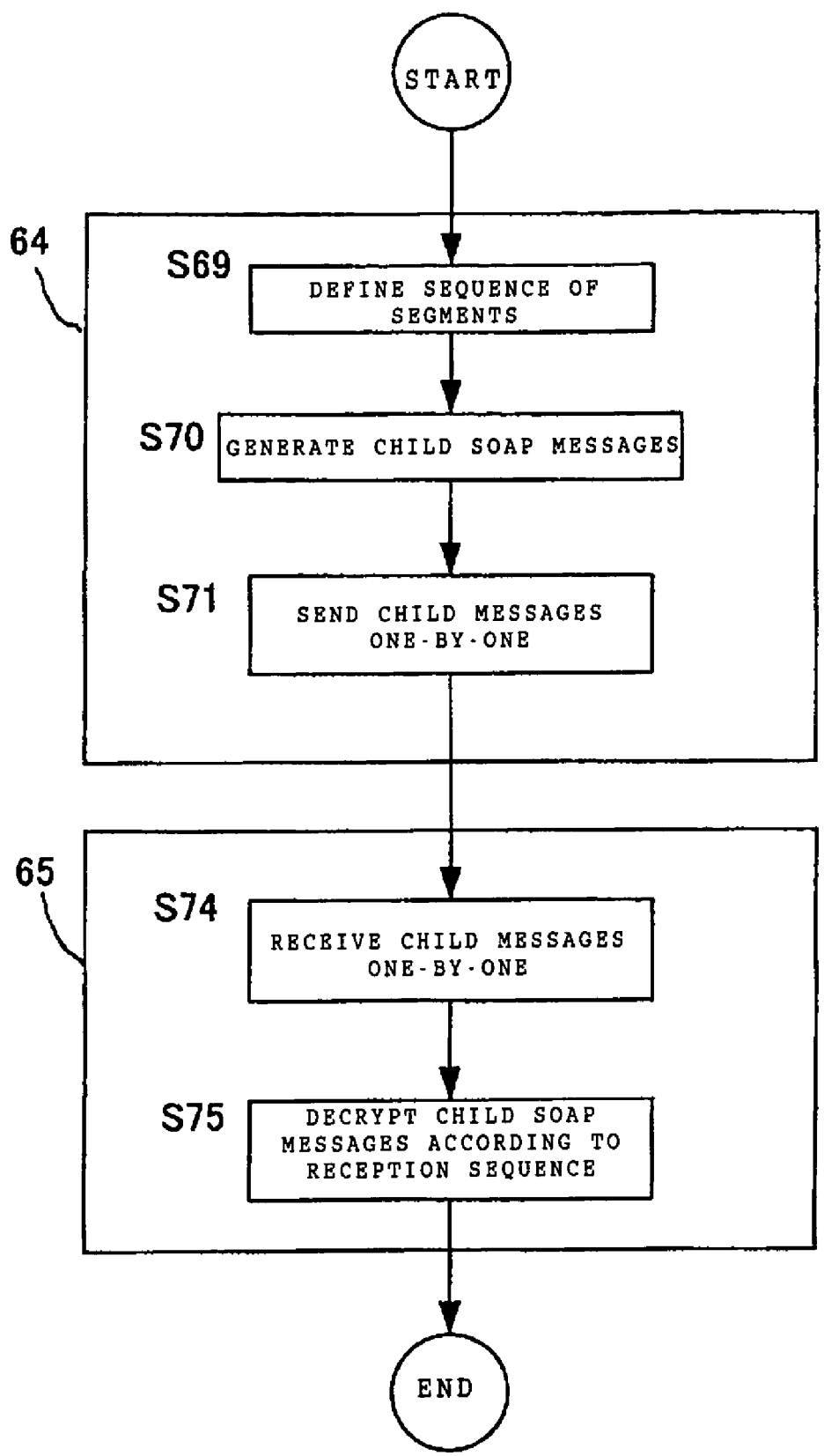
FIG. 9 is an example of a flowchart of a method of processing a response SOAP message which is an example of applied to the Web Service system.

FIG. 9 is a flowchart of a method of processing a response SOAP message which is applied to the Web Service system 10. The method of processing a response SOAP message includes a method portion 64 to be executed by the SOAP message intermediate processing unit 24, and a method portion 65 to be executed by the request means 11. The method portion 64 includes Steps S69, S70, and S71, and the method portion 65 includes Steps S74 and S75. In Step S69, the segment sequence when one SOAP message (hereinafter referred to as the "parent SOAP message") as one response sent from the provider 15 to the request means 11 is divided into a plurality of segments based on a predetermined division criterion is defined as a defined sequence. In Step S70, one SOAP message (=the "child SOAP message") containing a content of one segment is generated for each of the segments. In Step S71, the respective child SOAP messages are sent to the request means 11 in accordance with the defined sequence of the segments corresponding to the child SOAP messages. In Step S74, each of SOAP messages (=the "child SOAP messages") is received in accordance with a predetermined defined sequence, where each of the child SOAP messages is assigned to each of a plurality of segments into which the one SOAP message (=the "parent SOAP message") as one response concerning the Web Service is divided. In Step 75, each of the child SOAP messages is decrypted in accordance with a reception sequence of the child SOAP messages, in parallel with the step of receiving each of the child SOAP messages.

Figure 10:
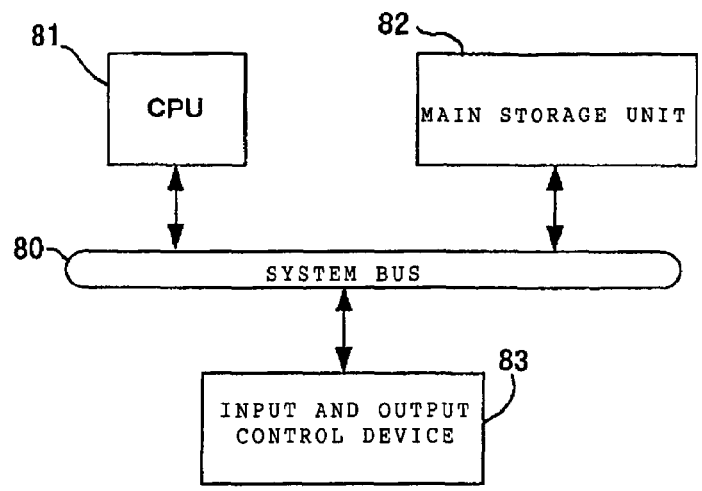
FIG. 10 is an example of a view showing a hardware configuration for executing a program.

FIG. 10 is a view showing a hardware configuration for executing a program. The above-described request means 11 and the gateway 13 respectively include the hardware illustrated in FIG. 10. A program for causing a computer to function as each of the means of the Web Service system 10, the request means 11, and the SOAP message intermediate processing unit 24 described above is executed by use of the hardware illustrated in FIG. 10. Alternatively, a program for causing a computer to execute the respective steps of the method of processing a request SOAP message and the method of processing a response SOAP message is executed by use of the hardware illustrated in FIG. 10. A CPU 81, a main storage device 82 and an input and output control device 83 are connected to a system bus 80. The above-described means or steps can be executed as a coded program. The input and output control device 83 includes a hard disk interface and the like, and various programs to be executed by the CPU 81 are stored in a hard disk drive and the like. The programs are stored in the main storage device 82 before execution by the CPU 81. The CPU 81 sequentially reads lines of code in the main storage device 82, and thereby executes the programs.

EXAMPLE

Figure 11:
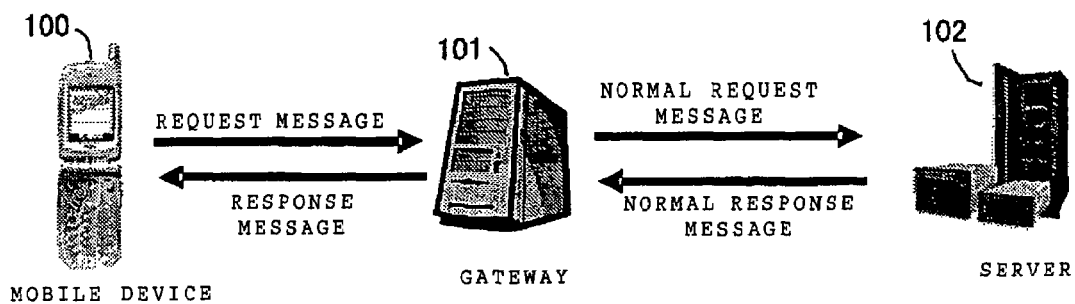
FIG. 11 is an example of a view showing a system configuration which is envisioned for an example of the present invention.

Now, an example of the present invention will be described. FIG. 11 is a view showing a system configuration which is envisioned for the example. In the drawing, the REQUEST MESSAGE represents the request, and the RESPONSE MESSAGE represents the response. The description "NORMAL" means to be identical to a conventional technique. A mobile device 100 as the request means is assumed to be connected to a server 102 as the provider through a gateway 101 managed by a cellular telephone carrier or a wireless communication company. In this case, from a technical point of view, it is also possible to apply a management method in which the gateway 101 takes care of the processing concerning the digital signature or encryption as a substitute, and the security processing is not adopted to the mobile device 100 per itself. However, it is easy to find a system which is not suitable for such a management method. For example, assuming a Web Service for allowing an employee to have access to the server 102 of his or her company from the mobile device 100, it is easily imaginable that the company would like to ensure security against the gateway 101 managed by other companies. To satisfy such a condition, it is not appropriate to allow the gateway 101 to take care of the processing concerning the digital signature or encryption as a substitute, but the mobile device 100 is supposed to perform the processing on its own. Here, it is assumed that the gateway 101 of the wireless communication company is interposed between the mobile device 100 such as a cellular telephone or a PDA and the server 102. It is also assumed that the gateway 101 is capable of operating on a message received from the mobile device 100 and a message to be sent to the mobile device 100.

(Solution 1)

Figure 12:
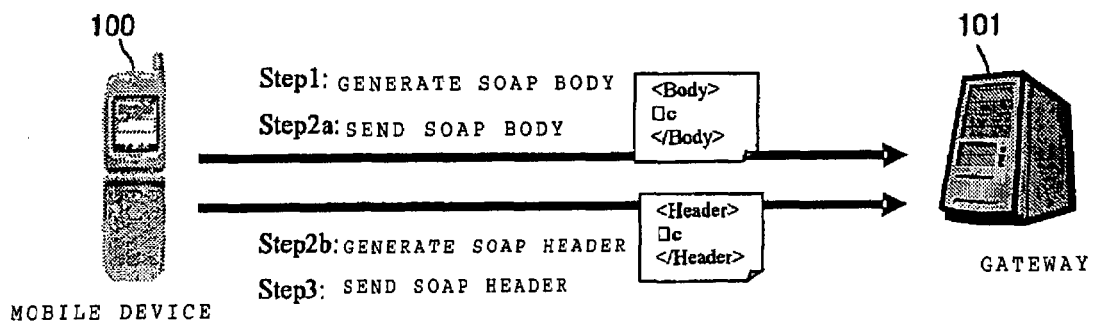
FIG. 12 is an example of an explanatory view about division of an outgoing message in the example.
Figure 13:
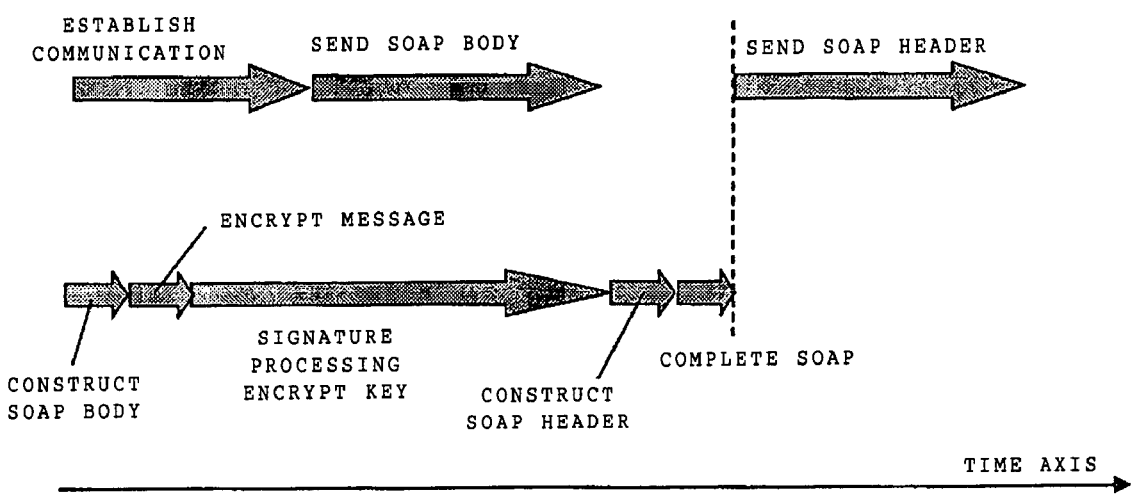
FIG. 13 is an example of a view showing breakdown of time for processing by respective processing portions in Solution 1, in which a lateral axis represents a time axis.

FIG. 12 is an explanatory view about division of an outgoing message in the example. Parallel processing by the mobile device 100 is achieved by the following procedures concerning the processing for sending the message from the mobile device 100 to the gateway 101. In this solution, the SOAP message constructed by the mobile device 100 is divided into two segments of the body segment and the header segment before reaching the gateway 101. The gateway 101 is designed to combine the divided segments into one message and then to transfer the message to the server 102. Here, breakdown of the time for the processing is shown in FIG. 13, in which a lateral axis represents a time axis.

S1: A thread is started and establishment of communication with the gateway 101 is attempted by use of the thread.

S2: The following processing is carried out in parallel with S1.

(a): The body segment of the SOAP message is constructed.

(b): Message coding out of security processing is executed while making reference to the SOAP body. All the processing which requires operation on the SOAP body is carried on, whereas the rest of the processing is put off.

S3: The SOAP body is sent if the communication has been established before completion of S2(b). If the communication has not been established, the SOAP body is sent after confirming the establishment.

S4: The following processing is executed in parallel with Step S3.

(a): Encryption of a key, calculation of a digest value, calculation of a signature value out of the security processing are executed.

(b): The SOAP header is constructed. Results of encryption of the key, calculation of the digest value, and calculation of the signature value are incorporated into the SOAP header to complete the SOAP header.

S5: Transmission of the SOAP header is started if the transmission of the SOAP body and reception from the gateway 101 are completed at the end of S4(b). If the transmission and the reception are not completed, the transmission of the SOAP header is started after confirming the completion of reception of the response from the gateway 101.

Of the above-described processing, S1 and S2 are processed in parallel, and S3 and S4 are processed in parallel. The entire processing is expected to be speeded up due to the parallel processing of the S3 and S4(a), which require the longest time for processing when using the mobile device 100 that consumes time for sending the message.

The above-described procedures are written on the assumption of using a protocol, such as HTTP, which is designed to send and receive the entire message at the same time. When applying the stream type protocol, it is in theory possible to (a) send part of the SOAP body while encrypting the remaining portion of the SOAP body (to process S2(b) and S3 in parallel), and to (b) send part of the SOAP header while constructing the remaining portion of the SOAP header (to process S4(b) and S5 in parallel) as well.

The protocol on the transport layer, on which the SOAP message is based, is not limited only to HTTP. It is also possible to apply SMTP or FTP as protocol.

(Solution 2)

Figure 14:
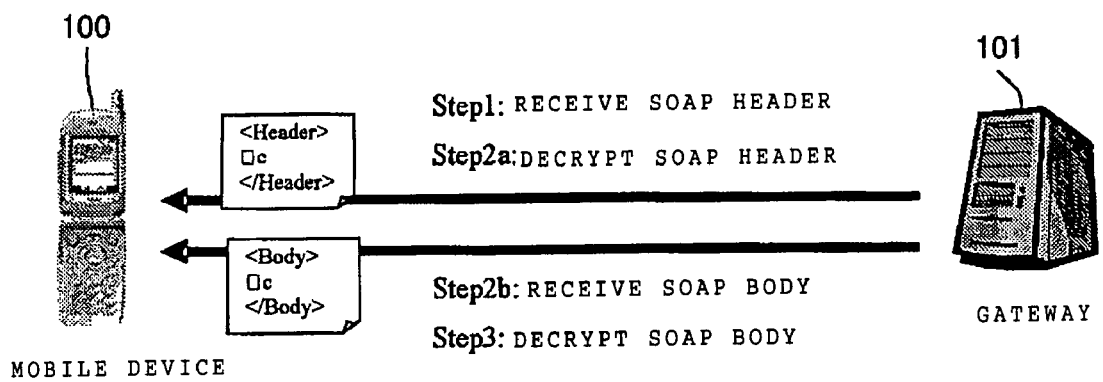
FIG. 14 is an example of an explanatory view about division of an incoming message.
Figure 15:
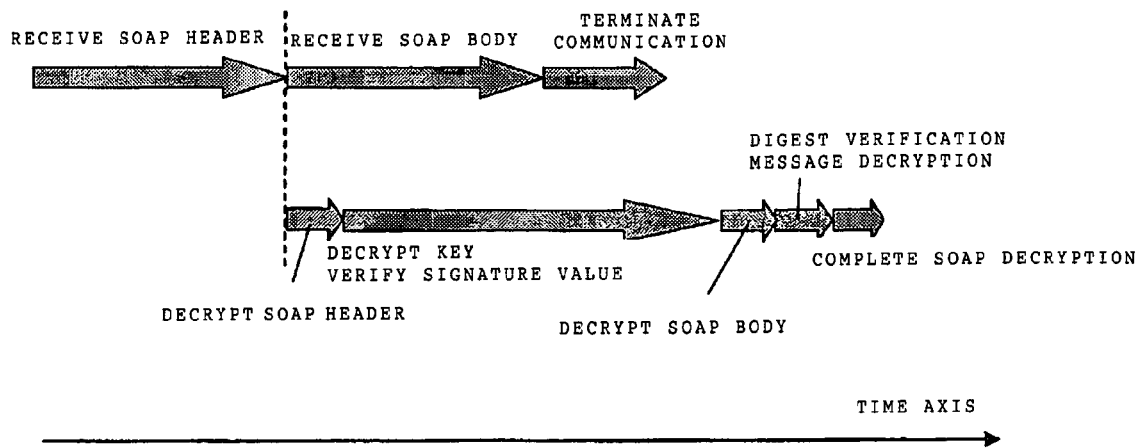
FIG. 15 is an example of a view showing breakdown of the time for processing by respective processing portions in Solution 2, in which a lateral axis represents a time axis.

FIG. 14 is an explanatory view about division of an incoming message. Parallel processing by the mobile device 100 is achieved by the following procedures concerning the processing for receiving the message from the gateway 101 to the mobile device 100. In this solution, the SOAP message received by the gateway 101 is divided into two segments of the body segment and the header segment before reaching the mobile device 100. Here, breakdown of the time for the processing is shown in FIG. 15, in which a lateral axis represents a time axis.

S1: The SOAP header is received from the gateway 101.

S2: When reception of the SOAP header is completed, the SOAP body is subsequently received from the gateway 101.

S3: The following processing is carried out in parallel with S2.

(a): The SOAP header is decrypted and information necessary for signature verification and decryption is accumulated.

(b): The key written in the SOAP header is decrypted. The signature value is verified as well. At this time, it is possible to decrypt the key and to verify the signature value in parallel.

(c): In regard to the received SOAP body, the respective processing is prepared by copying an object of signature verification and of message decryption, and the like into a buffer.

S4: Decryption of the SOAP body is started if the communication is completed at the end of S3(b). If the communication is not completed, decryption of the SOAP body is started after confirming the completion of the reception.

S5: The decrypting of encrypted message portion in the SOAP body, the verification of digest value of the portion subject to the signature, and so forth, are performed.

S6: A value to be returned to an application is retrieved from the SOAP body after completion of the security processing.

Of the above-described processing, S2 and S3 are processed in parallel. The entire processing is expected to be speeded up due to the parallel processing of the S2 and S3(b), which require the longest time for processing when using the mobile device 100 that consumes time for receiving the message.

The above-described procedures are written on the assumption of using the protocol, such as HTTP, which is designed to send and receive the entire message at the same time. When applying the stream type protocol, it is in theory possible to (a) process part of the SOAP header while receiving the remaining portion of the SOAP header (to process S1 and S3 in parallel), and to (b) process part of the SOAP body while receiving the remaining portion of the SOAP body (to process S2 and S4 to S6 in parallel) as well.

Figure 16:
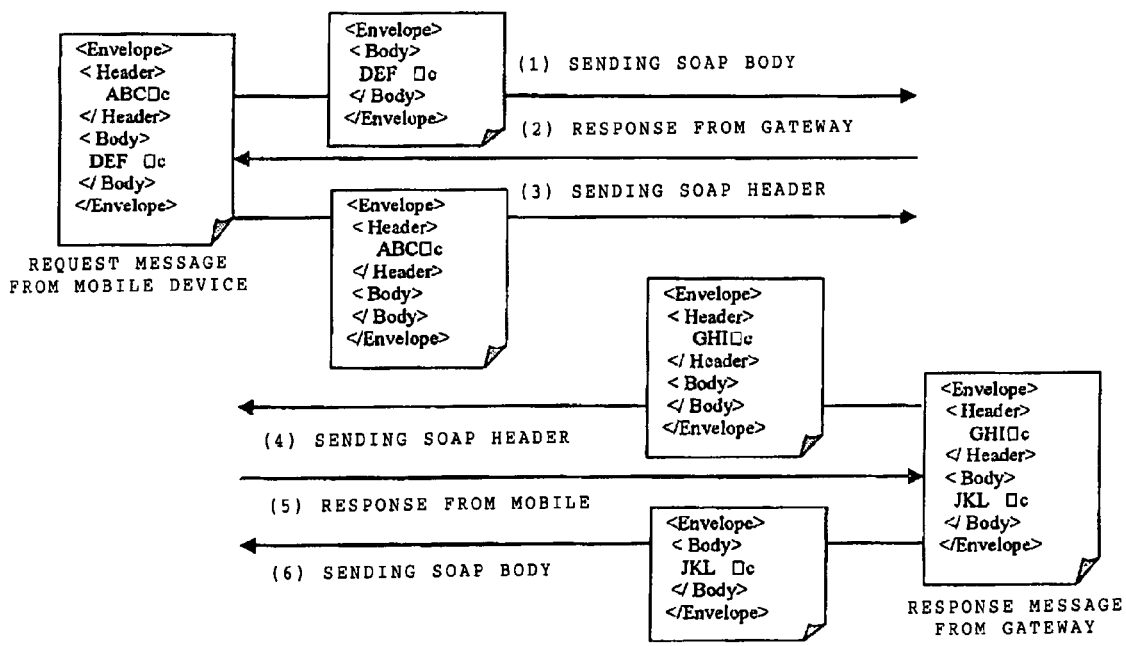
FIG. 16 is an example of a view showing a message which is divided on the assumption of using a normal Web Service.

Examples of division of the SOAP message and communication procedures are shown in FIGS. 16 and 17. Note that FIG. 16 shows a message which is divided on the assumption of using a normal Web Service, and FIG. 17 shows a simply divided message which is permitted in conformity with the JSR172. Here, a protocol configured to send and receive the entire message at the same time and to communicate in accordance with the request-response format, such as HTTP, is assumed. When the stream type protocol is applied, the communication procedures are not limited to the following.

Here, it is regulated that a SOAP message always has a SOAP envelope element and has a SOAP body inside the SOAP envelope element. FIG. 16 shows a result of division of a SOAP message in accordance with the foregoing regulation. However, according to the JSR172 which regulates a Web Service on the Java 2 Micro Edition (J2ME) environment, a SOAP message between the gateway 101 and the mobile device 100 does not have to be strictly in compliance with the SOAP specifications when an appropriate SOAP message can be sent and received between the gateway 101 and the server 102. Therefore, in the Web Service in conformity with the JSR172, it is possible to send and receive a message without the SOAP envelope element or the SOAP body element as shown in FIG. 17, for example, between the mobile device 100 and the gateway 101. If it is possible to send and receive the message as shown in FIG. 17, the gateway 101 can communicate with the mobile device 100 just by simply dividing or combining messages. Accordingly, this aspect is more advantageous as compared to FIG. 16.

By dividing the SOAP message between the mobile device 100 and the gateway 101 and by performing the message processing and the communication processing in parallel, it is possible to achieve an effect of speeding up the processing concerning the Web Service and the Web Services security on the mobile device 100. The present invention is deemed effective in terms of the following business style, for example.

A cellular telephone carrier has completed a demonstration experiment of a system used for utilizing a cellular telephone for settlement as similar to a credit card. Such system architecture is based on the scenario of (a) insertion of a certificate and public key issued by a credit card company into a memory device to be installed in the cellular telephone, and (b) the credit card company specifying a purchaser and performing settlement by sending a message to which signature and encryption is adopted by use of the above-described certificate and public key from the cellular telephone to a shopping server 102 or a settlement server 102. In this case, the Web Services security is suitable for this system from a viewpoint of ensuring delivery of the message from the gateway 101 of the cellular telephone carrier to the shopping server 102 or the settlement server 102 without processing the signature or the encrypted data inputted by the cellular telephone. Moreover, since the gateway 101 of the cellular telephone carrier is directly involved in this system, the gateway 101 of the cellular telephone carrier can incorporate division processing or combination processing into the SOAP message. If the time for processing the Web Services security becomes a problem in this business style, the present invention seems suitable for consideration.

(Measurement of Time for Processing)

At the moment, it is impossible to measure the time for processing by applying the present invention to a mobile device 100 owned by the inventors due to the following reasons. Accordingly, it is impossible to demonstrate the example and effects of the present invention by use of actual measurement results.

Reason 1: The signature and the API for encryption which are installed in the mobile device 100 are not disclosed in public, and it is therefore impossible to call a Web Service by use of such information.

Reason 2: A library including the signature processing, the encryption processing, and the like may be installed as a part of an application. However, it is difficult to install such a library within an application capacity of a mobile cellular telephone and the like, which is currently available on the market.

Accordingly, in this specification, the degree of improvement in the time for processing when implementing the present invention will be estimated with reference to the following data 1 and 2 instead.

(Data 1) The time for processing measured on an actual mobile device 100, which is measured by a business partner of the inventors while using implementation of the Web Service and the Web Services security conducted by the inventors.

(Data 2) The time for communication measured by means of sending and receiving a SOAP message from an actual cellular telephone to the gateway 101 while using implementation of the Web Service by the inventors.

The time measured in (Data 1) is shown in FIG. 18. In this measurement, to the SOAP bodies of each of an outgoing message from the mobile device 100 and an incoming message to the mobile device 100, both signature and encryption are adopted once. The SOAP message is similar to the (Example of SOAP message) to be described later (A message used herein was not completely identical to the (Example of SOAP message) but was substantially similar thereto).

The time measured in (Data 2) is shown in FIG. 19. In this measurement, the time required for sending and receiving the SOAP messages in various sizes resulted in an approximately linear function of message size s. Accordingly, the coefficient of the function was found by approximation.

By use of the linear function in these measurement results, it is possible to assume that the time shown in FIG. 20 is required for sending and receiving the (Example of SOAP message) to be described later.

The improvement in the time for processing according to the present invention is estimated by use of the above-described data. Note that the time for processing inside the server 102 is considered constant in any stages of the processing and is therefore ignored herein. Meanwhile, the time required by the gateway 101 for processing the message is deemed extremely small as compared to the entire time for processing, and therefore ignorable.

(Estimation 1)

Concerning the communication at first time of starting an application, the time for processing according to the conventional implementation and the time for processing when using both of (Solution 1) and (Solution 2) of the present invention are estimated.

As shown in the following breakdown, the total time for processing according to the conventional implementation is estimated to be 27493.1 milliseconds.

4618.4 milliseconds: Construction of an outgoing message ((Transmission 1)+(Transmission 2))

7246.6 milliseconds: Establishment of communication ((Communication 1))

6413.4 milliseconds: Sending the message ((Communication 3))

806.3 milliseconds: Receiving the message ((Communication 3))

8408.4 milliseconds: Decrypting the received message ((Reception 1)+(Reception 2))

As shown in the following breakdown, the total time for processing according to the present invention is estimated to be 24932.4 milliseconds on the assumption that the communication processing and the message processing are completely executed in parallel.

7246.6 milliseconds: Parallel processing of the first half of construction of an outgoing message ((Transmission 1)) and establishment of the communication ((Communication 1))

2843.0 milliseconds: Parallel processing of the first half of sending the message ((Communication 5)) and the last half of construction of the outgoing message ((Transmission 2))

5715.8 milliseconds: The last half of sending the message ((Communication 4))

718.6 milliseconds: The first half of receiving the message ((Communication 4))

7151.7 milliseconds: Parallel processing of the last half of receiving the message ((Communication 5)) and the first half of decrypting the received message ((Reception 1))

1256.7 milliseconds: The last half of decrypting the received message ((Reception 2))

(Estimation 2)

Concerning the communication at second or later time, which is after starting the application, the time for processing according to the conventional implementation and the time for processing when using both of (Solution 1) and (Solution 2) of the present invention are estimated.

As shown in the following breakdown, the total time for processing according to the conventional implementation is estimated to be 22357.6 milliseconds.

4618.4 milliseconds: Construction of and outgoing message ((Transmission 1)+(Transmission 2))

2111.1 milliseconds: Establishment of communication ((Communication 2))

6413.4 milliseconds: Sending the message ((Communication 3))

806.3 milliseconds: Receiving the message ((Communication 3))

8408.4 milliseconds: Decrypting the received message ((Reception 1)+(Reception 2))

As shown in the following breakdown, the total time for processing according to the present invention is estimated to be 19796.9 milliseconds on the assumption that the communication processing and the message processing are completely executed in parallel.

2111.1 milliseconds: Parallel processing of the first half of construction of an outgoing message ((Transmission 1)) and establishment of communication ((Communication 2))

2843.0 milliseconds: Parallel processing of the first half of sending the message ((Communication 5)) and the last half of construction of the outgoing message ((Transmission 2))

5715.8 milliseconds: The last half of sending the message ((Communication 4))

718.6 milliseconds: The first half of receiving the message ((Communication 4))

7151.7 milliseconds: Parallel processing of the last half of receiving the message ((Communication 5)) and the first half of decrypting the received message ((Reception 1))

1256.7 milliseconds: The last half of decrypting the received message ((Reception 2))

As a matter of fact, the time for processing the portions of parallel processing according to the present invention is predicted to be slightly longer than the estimated time. Note that, in this specification, the estimation has been conducted in terms of a message including a small SOAP body segment (829 bytes) in order to use the measurement results offered by the business partner of the inventors. However, as the SOAP body segment becomes larger, it is likely that the difference in the time for processing becomes more significant between the present invention and the conventional implementation (=superiority of the present invention becomes clearer).

(Example of SOAP Message)

In the following SOAP message, three digits in the 300 range on the left represent line numbers. This SOAP message corresponds to the above-described parent SOAP message. The line numbers 311 to 382 represent the header, and the line numbers 383 to 395 represent the body.

```
300:POST /Echo__ArraytestWeb/services/EchoArray HTTP/1.1
301:User-Agent: Java1.2.2
302:Host: sfumiko-server.trl.ibm.com
303:Connection: close
304:Content-Length: 5122
305:Content-Type: text/xml;charset=utf-8
306:SOAPAction:
307:<s:Envelope
308:xmlns:s=http://schemas.xmlsoap.org/soap/envelope/
309:xmlns:xsd=http://www.w3.org/2001/XMLSchema
310:xmlns:xsi="http://www.w3.org/2001/XMLSchema-instance">
311: <s:Header>
312:    <w:Security xmlns:w="http://schemas.xml-
soap.org/ws/2003/06/secext" s:mustUnderstand="1">
313:       <w:BinarySecurityToken
314:xmlns:u=http://schemas.xmlsoap.org/ws/2003/06/utility
315:EncodingType="w:Base64Binary"
316:ValueType="w:X509v3" u:Id="X509BST__
8000939669883004294__1065777034858">
317:MIIB7jCCAVcCBD9hYbowDQYJKoZIhvcNAQEEBQAwPjEL-
MAkGA1UEBhMCS1AxDDAKBgNVBAoTA01C
TTEMMAoGA1UECxMDVFJMMRMwEQYDVQQDDApSU0FfQ2xpZ-
W50MB4XDTAzMDkxMjA2MDMzOFoXDTA0MDkx
MTA2MDMzOFowPjELMAkGA1UEBhMCS1AxDDAKBgNVBAoTA-
01CTTEMMAoGA1UECxMDVFJMMRMwEQYDVQQD
DApSU0FfQ2xpZW50MIGfMA0GCSqGSIb3DQEBAQUAA4GNAD-
CBiQKBgQDGQQtBMUGWLDFT2BwiCz0tyyJ4
zjBVndEtYZGRyeJmRtM0p4WIJ+MfBjYyvCNpm4AVV+
rg7zbsqo1p5Fxta3Un3ef04MMgYnUmPT35+
B1A062n/iZmAdSOt+Wiiwqgt5SE1Mi6c1R3TMdOr1dEtqngYEfT-
sgSkQv+wBSXbE8np+wIDAQABMA
0GCSqGSIb3DQEBBAUAA4GBAE3bs8xb5KNc61L3x6rIftzJHZxtb3s-
D7oCttiS4U0wgHwE/KyeCyMLi8W
rrSa3ImDyjCjLoTATgECCiRBsLOG00GgSqrTJsSP6T9s2FVc1/pab0w-
SuvhB2j4WR/MQG1M5zrYcAM4h
HcUr5vnhs6sA91wVzvmtmbZxjHnzrsphes</w:BinarySecurityToken>
318:    <e:EncryptedKey xmlns:e=
"http://www.w3.org/2001/04/xmlenc#">
319:       <e:EncryptionMethod Algorithm=
"http://www.w3.org/2001/04/xmlenc#rsa-1__5"/>
320:       <d:KeyInfo xmlns:d=
"http://www.w3.org/2000/09/xmldsig#">
321:          <w:SecurityTokenReference>
322:             <w:KeyIdentifier>mIkBAV0xjRhM1l8oag50LVP55ns=
</w:KeyIdentifier>
323:          </w:SecurityTokenReference>
324:       </d:KeyInfo>
325:       <e:CipherData>
326:<e:CipherValue>
327:eXfS8n/XjZ2BLm7eVLKf92qx/Qoc7ektAWBJ+
xpcMc1LLCRXcn/afwWDCXXQ/ZHNLeBQodRcUas
6ujvBbGhU6xaJfhAGsj0LXCBXi9EYmxPuy1UL50nNh0qJnIJsfxgYBnT-
gk2ny30EfNE2NQxjgtbCRvJv
FAk1Pdc0mKRvx0zw=<
328:/e:CipherValue>
329:       </e:CipherData>
330:       <e:ReferenceList>
331:          <e:DataReference URI=
"#enc__173517017163344533__1065777035148"/>
332:          <e:DataReference URI=
"#enc__8650492430262383644__1065777035399"/>
333:       </e:ReferenceList>
334:    </e:EncryptedKey>
335:    <d:Signature xmlns:d=
"http://www.w3.org/2000/09/xmldsig#">
336:       <d:SignedInfo xmlns:d=
"http://www.w3.org/2000/09/xmldsig#">
337:          <d:CanonicalizationMethod Algorithm=
"http://www.w3.org/2001/10/xml-exc-c14n#">
</d:CanonicalizationMethod>
338:          <d:SignatureMethod Algorithm=
"http://www.w3.org/2000/09/xmldsig#
rsa-sha1"></d:SignatureMethod>
339:          <d:Reference URI=
"#tsc__5174836288291415044__1065777035348">
340:             <d:Transforms>
341:                <d:Transform Algorithm=
"http://www.w3.org/2001/10/xml-exc-c14n#"></d:Transform>
342:             </d:Transforms>
343:             <d:DigestMethod Algorithm=
"http://www.w3.org/2000/09/xmldsig
#sha1"></d:DigestMethod>
344:             <d:DigestValue>JhhPEHjP9fR2T39+
KmZTIQ6B+AA=</d:DigestValue
>
345:          </d:Reference>
346:          <d:Reference URI=
"#tse__5174836288291415044__1065777035348">
347:             <d:Transforms>
348:                <d:Transform Algorithm=
"http://www.w3.org/2001/10/xml-exc-c14n#"></d:Transform>
349:             </d:Transforms>
350:             <d:DigestMethod Algorithm=
"http://www.w3.org/2000/09/xmldsig
#sha1"></d:DigestMethod>
351:             <d:DigestValue>frlyPRyyWh7I00T0t4B7QMgd2Zw=
</d:DigestValue>
352:          </d:Reference>
353:          <d:Reference URI=
"#sign__961746961227845441__1065777035378">
354:             <d:Transforms>
355:                <d:Transform Algorithm=
"http://www.w3.org/2001/10/xml-exc-c14n#"></d:Transform>
356:             </d:Transforms>
357:             <d:DigestMethod Algorithm=
"http://www.w3.org/2000/09/xmldsig
#sha1"></d:DigestMethod>
358:             <d:DigestValue>9qHLwsH9q1tk0277D6TTVrcdd8s=
</d:DigestValue>
359:          </d:Reference>
360: </d:SignedInfo>
<d:SignatureValue>pJ/g8fV8l0TjSDWTbk/entiMlX1cMfA/c/ZGej0B4/
ewzTp2KFQLEFy7ghv01ygbVARnu/hYNxPnhq04NMB0tcmXPFzaWn-
oHnAycsAf21VphJk4U2F15kQjZHv
oVtsWA3LpYYsuXqsVgof5iI6GMXgrsHxy2sgEVWUiaDcpjfqo=
</d:SignatureValue>
361:       <d:KeyInfo>
362:          <w:SecurityTokenReference>
363:             <w:Reference URI=
```

-continued

```
"#X509BST_8000939669883004294_1065777034858
"/>
364:        </w:SecurityTokenReference>
365:      </d:KeyInfo>
366:    </d:Signature>
367:    <e:EncryptedData
368:xmlns:e=http://www.w3.org/2001/04/xmlenc#
369:Id="enc_173517017163344533_1065777035148"
370:Type="http://www.w3.org/2001/04/xmlenc#Element">
371:      <e:EncryptionMethod Algorithm=
"http://www.w3.org/2001/04/xmlenc#tripledes-cbc"/>
372:      <e:CipherData>
<e:CipherValue>7VnWQO88ymAtijDYZLufL3v1qjGm6yCY4vqr
zFZ0t6r9Cw1b0zJYY+d8LtmpSPA0QhxZtDACqj0Xanv+
72Rr76K0S+G1iMlto0aA1TR2iwbj7DWFf
olesphjznWSAA+qzvbXd0H4ES4x8AfRlpAkbzIvm0ilqn4iudJNdiWT-
WVIS6nV90QihNSb3elN0d2IE
HafKQ+HSdfyPp8yvk8cHrHx492k6X8YAkqjufTbszcthfNdX9wMH8lT-
as154ob5s4hNHBcm3R0BAib5
RqV67Dw==</e:CipherValue>
373:      </e:CipherData>
374:    </e:EncryptedData>
375:  </w:Security>
376:  <u:Timestamp xmlns:u=
"http://schemas.xmlsoap.org/ws/2003/06/utility">
377:    <u:Created
378:xmlns:u=http://schemas.xmlsoap.org/ws/2003/06/utility u:Id=
"tsc_517483628829
1415044_1065777035348">2003-10-10T09:10:35Z</u:Created>
379:    <u:Expires
380:xmlns:uhttp://schemas.xmlsoap.org/ws/2003/06/utility u:Id=
"tse_517483628829
1415044_1065777035348">2003-11-10T09:10:35Z</u:Expires>
381:    </u:Timestamp>
382: </s:Header>
383: <s:Body
384:xmlns:s=http://schemas.xmlsoap.org/soap/envelope/
385:xmlns:u=http://schemas.xmlsoap.org/ws/2003/06/utility
386:u:Id="sign_961746961227845441_1065777035378">
387:    <e:EncryptedData
388:xmlns:e=http://www.w3.org/2001/04/xmlenc#
389:Id="enc_8650492430262383644_1065777035399"
390:Type="http://www.w3.org/2001/04/xmlenc#Content">
391:      <e:EncryptionMethod Algorithm=
"http://www.w3.org/2001/04/xmlenc#tripledes-cbc"/>
392:      <e:CipherData>
<e:CipherValue>Gj4UeMvvEvSuimE7FFV39GV2y780FJE1ytiUic9g
FPdSBc9gYa0srBRBC989fuKJuhbW3kGD14+
GNjzyZ/K14buTTbPvJoKnemy31XVzHNusObY5PPtvpfJ
BRIUtuIHb</e:CipherValue>
393:      </e:CipherData>
394:    </e:EncryptedData>
395: </s:Body>
396:</s:Envelope>
```

Although advantageous embodiments of the present invention have been described in detail, it should be understood that various changes, substitutions and alternations can be made therein without departing from spirit and scope of the inventions as defined by the appended claims.

The present invention can be realized in hardware, software, or a combination of hardware and software. It may be implemented as a method having steps to implement one or more functions of the invention, and/or it may be implemented as an apparatus having components and/or means to implement one or more steps of a method of the invention described above and/or known to those skilled in the art. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or after reproduction in a different material form.

Thus the invention includes an article of manufacture which comprises a computer usable medium having computer readable program code means embodied therein for causing one or more functions described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention. Methods of this invention may be implemented by an apparatus which provides the functions carrying out the steps of the methods. Apparatus and/or systems of this invention may be implemented by a method that includes steps to produce the functions of the apparatus and/or systems.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A request means which sends a request concerning a web service to a provider through the Internet and which receives a response concerning the web service from the provider through the Internet, the request means comprising:
    sequence definition means for defining, as a defined sequence, a segment sequence when one parent simple object access protocol message as one request concerning a web service is divided into a plurality of segments based on a predetermined division criterion;
    segment creation means for creating a content of each of the segments of the parent simple object access protocol message in accordance with the defined sequence; and sending means for executing sending processing in parallel with creation processing by the segment creation means, wherein a header of the simple object access protocol message is divided for parallel processing of partial portions of the header, and a body of the simple object access protocol message is divided for parallel processing of partial portions of the body wherein one child simple object access protocol message containing the content of one segment is assigned to each of the segments, and for sending each of the child simple object access protocol messages to the provider in accordance with a creation sequence of the contents of the segments, wherein the predetermined division criterion is configured to define a header of the parent simple object access protocol message and a body of the parent simple object access protocol message at least as one segment respectively, with header segments constituting headers in child simple object access protocol messages, and body segments constituting bodies in child simple object access protocol messages and the child simple object access protocol messages include messages with both headers and bodies;

wherein the sequence definition means is configured to define a segment including only a header of the parent simple object access protocol message and a segment including only a body of the parent simple object access protocol message respectively as a header segment and a body segment, and to locate the header segment behind the body segment in the defined sequence, and wherein the parent simple object access protocol message is a simple object access protocol message with web services security adopted thereto;

wherein the simple object access protocol body is encrypted with a symmetric key; and wherein the simple object access protocol header is encrypted with the public key of the provider after information concerning a security token, a digital signature, and the symmetric key is written therein.

* * * * *